US005981090A

United States Patent [19]

Ott

[11] Patent Number: 5,981,090

[45] Date of Patent: Nov. 9, 1999

[54] PINS FOR ELECTRONIC ASSEMBLIES

[75] Inventor: Bernhard Ott, Herborn, Germany

[73] Assignee: Berkenhoff GmbH, Heuchelheim, Germany

[21] Appl. No.: 09/117,835

[22] PCT Filed: Feb. 13, 1997

[86] PCT No.: PCT/EP97/00673

§ 371 Date: Aug. 12, 1998

§ 102(e) Date: Aug. 12, 1998

[87] PCT Pub. No.: WO97/31129

PCT Pub. Date: Aug. 28, 1997

[30] Foreign Application Priority Data

Feb. 20, 1996 [DE] Germany ........................... 196 06 116

[51] Int. Cl.[6] ...................................................... B32B 15/01

[52] U.S. Cl. ........................................ 428/668; 228/180.5

[58] Field of Search .................................... 428/674, 668, 428/669; 228/180.5

[56] References Cited

U.S. PATENT DOCUMENTS

| | | | |
|---|---|---|---|
| 5,139,890 | 8/1992 | Cowie et al. | 428/670 |
| 5,476,211 | 12/1995 | Khandros | 228/180.5 |

FOREIGN PATENT DOCUMENTS

| | | |
|---|---|---|
| 1.298.462 | 12/1961 | France . |
| 40 05 836 | 8/1991 | Germany . |
| 02 166245 | 12/1988 | Japan . |
| 444 428 | of 1979 | U.S.S.R. . |
| 260565 | 12/1926 | United Kingdom . |
| 2 093 064 | 11/1981 | United Kingdom . |

OTHER PUBLICATIONS

“Kupfer und Kupferlegierungen in der Technik” by Dr.–Ing. Kurt Dies, Springer–Verlag Berlin/Heildelberg/New York 1967, pp. 190–207.

“Kupferwerkstoffe—Eigenschaften und Anwendungen in der Elektrotechnik und Elektronik” by E. Arpaci & A. Bode, METALL—46th Year, Edition 1, Jan. 1992, pp. 22–31.

*Primary Examiner*—Deborah Jones
*Assistant Examiner*—Darlene David
*Attorney, Agent, or Firm*—Flynn, Thiel, Boutell & Tanis, P.C.

[57] ABSTRACT

The pin for electronic assemblies according to the present invention consists of a core alloy with 0.2 to 1.5 wt. % Ag, the remainder copper, whereby at least the contact surface of the pin is provided with one or several highly conductive and/or easily solderable coatings. With this not only a higher electric conductivity of the contact is obtained but also a comparatively high strength with simple production and good workability, which makes it possible to miniaturize the pins.

5 Claims, No Drawings

PINS FOR ELECTRONIC ASSEMBLIES

The invention relates to pins according to the Oberbegriff of claim 1. The demands on pins for electronic assemblies are very high since they must have, on the one hand, a good electric conductivity and thus a good heat conductivity and, on the other hand, a high strength so that they, on the one hand, are not bent during insertion and, on the other hand, experience little wear. Furthermore, these pins, which serve as contacts, must also be very flexible and must be suited for coating. A high strength is furthermore necessary if one wants to reduce the dimensions, in particular the cross sections, of the contacts.

Standard alloys, as for example brass or bronze, are presently used for such contacts, which, however, have a comparatively low electric conductivity. Materials with a higher electric conductivity with a simultaneously higher strength are, for example, CuFe2P-alloys. Theses alloys, however, have the disadvantage that they, because of their high iron content, have the tendency to precipitate iron with the corresponding corrosion problems. In particular when these pins are used for safety-relevant parts, it cannot be guaranteed that a sufficiently and secure contact transfer exists at all times.

Alloys for contacts are known from U.S. Pat. No. 5,139, 890, which are assembled out of a core material, which has a coating. Either copper or, however, copper alloys like beryllium copper or nickel copper alloys are used as core material. A silver coating is then applied onto this alloy forming a contact, whereby here, if necessary, blocking layers of gold are also inserted. The reason for this construction of the contacts is that these have a good wear resistance, are condensation-resistant, and are insensitive to sulfating.

A welding electrode is known from FR-1 298 462, which is supposed to have a high thermal and electric conductivity, and which is heat-resistant at high temperatures. As such a welding electrode an alloy of 96.35% copper, 3.50% silver and 0.15% zircon is suggested.

The basic purpose of the invention is to provide contacts of the above-mentioned type in such a manner that they, aside of a high electric conductivity and a comparatively high strength, can be easily manufactured, can be easily worked, and are very flexible, and experience no disadvantageous precipitations.

This purpose is attained with the characteristics of claim 1.

A pin of the invention is distinguished by a high conductivity, which, compared with pure copper, is only slightly less. A conductivity of over 40 Siemens can be achieved with this contact of CuAg-alloys. The tensile strength as such can be compared with the CuFe2P-alloy, whereby here strength values of over 600 $N/mm^2$ are obtained. Furthermore, the contacts of the invention are distinguished by a slight temperature increase during an electric load. The corrosion resistance is, in comparison to copper, further increased by the addition of silver.

The contacts can be provided in accordance with the invention comparatively easily with a coating, for example, with a rhodium, palladium, silver, indium, iridium, platinum, gold, tin, nickel, copper or lead coating. A coating with the aforementioned metals or their alloys results, on the one hand, in a good soldering ability and, on the other hand, in a low transfer resistance, namely a good contact ability. Thus, the one end of the contact can advantageously be provided with an easily solderable coating and the other end with a highly conductive coating. Due to the higher strength and conductivity it is possible to design the contacts with smaller cross sections so that the density of the number of plugs can be increased. A blocking layer of nickel or copper is advantageously provided between the core alloy and the outer coating, which blocking layer prevents phase-limit reactions between the core material and the outer coating.

The content of the core alloy of iron and manganese should each not exceed 0.8 wt. % and the content of silicon and aluminum should not exceed 0.3 wt. %. Phosphorus should in turn not exceed 0.1 wt. %. Zinc can advantageously be added up to 2 wt. %. Furthermore, titanium and chromium can be added to the core alloy, whereby these are added in amounts of each no more than 0.2 wt. %. The alloy elements iron and manganese are strength-increasing, whereas the other alloy elements act both as a deoxidation means and act also, due to precipitations, strength-increasingly. Chromium has proven to be particularly advantageous.

I claim:

1. Pins for electronic assemblies, wherein the contact consists of a core alloy with 0.2 to 1.5 wt. % Ag and at least one or more elements of the group 0 to 2 wt. % Zn,
0 to 0.8 wt. % Fe,
0 to 0.8 wt. % Mn,
0 to 0.3 wt. % Si,
0 to 0.3 wt. % Al,
0 to 0.1 wt. % of P,
0 to 0.2 wt. % of each Ti, Cr, and the remainder copper and common impurities, and wherein the contact surface of the core element is provided with one or more highly conductive and/or easily solderable coatings, which consist of one or more elements of the group Rh, Pd, Ag, In, Ir, Pt, Au, Sn, Cu, Ni and Pb.

2. The contact according to claim 1, wherein the contact has the following composition in wt. %:

Ag 0.9
P 0.02
Mn 0.1
Remainder Copper.

3. The contact according to claim 1, wherein the contact has the following composition in wt. %:

Zn 1.0
Ag 0.5
Mn 0.1
P 0.02
remainder copper.

4. The contact according to claim 1, wherein the one end of the contact is provided with an easily solderable coating and the other end with a highly conductive coating, which consist of one or more elements of the group Rh, Pd, Ag, In, Ir, Pt, Au, Sn, Cu, Ni and Pb.

5. The contact according to claim 2, wherein the one end of the contact is provided with an easily solderable coating and the other end with a highly conductive coating, which consist of one or more elements of the group Rh, Pd, Ag, In, Ir, Pt, Au, Sn, Cu, Ni and Pb.

* * * * *